United States Patent
Wicker et al.

(10) Patent No.: US 8,444,181 B2
(45) Date of Patent: May 21, 2013

(54) SINGLE-COLOR SCREEN PATTERNS FOR COPY PROTECTION

(75) Inventors: Thomas M. Wicker, Hemlock, NY (US); David M. Wicker, Dansville, NY (US); Michael Scott Caton, Oakfield, NY (US)

(73) Assignee: Document Security Systems, Inc., Rochester, NY (US)

( * ) Notice: Subject to any disclaimer, the term of this patent is extended or adjusted under 35 U.S.C. 154(b) by 1245 days.

(21) Appl. No.: 11/839,657

(22) Filed: Aug. 16, 2007

(65) Prior Publication Data

US 2008/0048433 A1 Feb. 28, 2008

Related U.S. Application Data

(63) Continuation-in-part of application No. 10/895,822, filed on Jul. 22, 2004, now abandoned, which is a continuation of application No. PCT/US03/32159, filed on Oct. 9, 2003.

(60) Provisional application No. 60/417,750, filed on Oct. 10, 2002, provisional application No. 60/417,751, filed on Oct. 10, 2002, provisional application No. 60/417,752, filed on Oct. 10, 2002, provisional application No. 60/417,753, filed on Oct. 10, 2002, provisional application No. 60/417,754, filed on Oct. 10, 2002, provisional application No. 60/417,755, filed on Oct. 10, 2002, provisional application No. 60/417,756, filed on Oct. 10, 2002, provisional application No. 60/417,757, filed on Oct. 10, 2002, provisional application No. 60/417,758, filed on Oct. 10, 2002.

(51) Int. Cl.
*B42D 15/00* (2006.01)
*B42D 15/10* (2006.01)

(52) U.S. Cl.
USPC .................. 283/72; 283/93; 283/94; 283/113; 283/114; 283/901; 283/902

(58) Field of Classification Search
USPC ............. 283/57, 58, 59, 72, 93, 94, 113, 114, 283/117, 901, 902
See application file for complete search history.

(56) References Cited

U.S. PATENT DOCUMENTS

| 2,952,080 A | 9/1960 | Avakian et al. |
| 3,675,948 A | 7/1972 | Wicker |

(Continued)

FOREIGN PATENT DOCUMENTS

| DE | 3602563 C1 | 4/1987 |
| DE | 19518228 A1 | 11/1996 |

(Continued)

OTHER PUBLICATIONS

Phillips, George K., "Combining Nanocharacter Printing, Digital Watermarking and UV Coded Taggents for Optimal Machine-Readable Security", Optical Security and Counterfeit Deterrence Techniques IV, Jan. 24, 2002, pp. 150-158, vol. 4677.

(Continued)

*Primary Examiner* — Dana Ross
*Assistant Examiner* — Justin V Lewis
(74) *Attorney, Agent, or Firm* — McDonnell Boehnen Hulbert & Berghoff LLP (57) ABSTRACT

A verifiable/copy-protected document features a combination of nearly identical line-screen patterns for embedding latent images within visually integrated settings. The latent images can be detected for purposes of verification with a matching viewer but are indistinguishable from their visually integrated settings under ordinary viewing conditions. The line-screen patterns, which can be incorporated into document artwork, are printed at certain combinations of line frequencies and print densities so that the line-screen patterns digitally reproduce as a largely undifferentiated solid tint.

58 Claims, 3 Drawing Sheets

U.S. PATENT DOCUMENTS

| | | | |
|---|---|---|---|
| 4,039,066 A | | 8/1977 | Quigley |
| 4,143,967 A | | 3/1979 | Wicker |
| 4,227,719 A | | 10/1980 | McElligott et al. |
| 4,227,720 A | | 10/1980 | Mowry, Jr. et al. |
| 4,255,652 A | | 3/1981 | Weber |
| 4,310,180 A | | 1/1982 | Mowry, Jr. et al. |
| 4,313,087 A | | 1/1982 | Weitzen et al. |
| 4,591,189 A | | 5/1986 | Holmen et al. |
| 5,018,767 A | | 5/1991 | Wicker |
| 5,149,140 A | * | 9/1992 | Mowry et al. .................. 283/93 |
| 5,193,853 A | | 3/1993 | Wicker |
| 5,443,579 A | | 8/1995 | Tanaka et al. |
| 5,487,567 A | | 1/1996 | Volpe |
| 5,707,083 A | | 1/1998 | Wallace |
| 5,722,693 A | | 3/1998 | Wicker |
| 5,735,547 A | | 4/1998 | Morelle et al. |
| 5,788,285 A | | 8/1998 | Wicker |
| 6,050,606 A | | 4/2000 | Foresti |
| 6,491,215 B1 | | 12/2002 | Irwin, Jr. et al. |
| 6,714,748 B1 | | 3/2004 | Nakayasu et al. |
| 2002/0114931 A1 | | 8/2002 | Beghello et al. |
| 2003/0030271 A1 | | 2/2003 | Wicker |

FOREIGN PATENT DOCUMENTS

| | | |
|---|---|---|
| EP | 0204552 A2 | 10/1986 |
| EP | 0328173 A1 | 8/1989 |
| EP | 0384897 A1 | 8/1990 |
| EP | 0490457 A1 | 6/1992 |
| EP | 0789270 A1 | 8/1997 |
| EP | 0882599 A1 | 12/1998 |
| EP | 1528784 A2 | 5/2005 |
| EP | 1626870 A1 | 2/2006 |
| FR | 2622840 A1 | 5/1989 |
| GB | 1138011 | 12/1968 |
| GB | 1344866 | 1/1974 |
| GB | 1434907 A | 5/1976 |
| GB | 2217258 A | 10/1989 |
| JP | 5-31980 U | 4/1993 |
| JP | 5-177919 A | 7/1993 |
| JP | 6-42203 U | 6/1994 |
| JP | 2001-18516 A | 1/2001 |
| JP | 2002135479 A | 5/2002 |
| JP | 2006-521721 A | 9/2006 |
| KR | 153034 B | 12/1998 |
| WO | 9008046 A1 | 7/1990 |
| WO | 9322145 A1 | 11/1993 |
| WO | 2004/068421 A2 | 8/2004 |
| WO | 2004110773 | 12/2004 |
| WO | 2006001793 A1 | 1/2006 |

OTHER PUBLICATIONS

Spannenburg, S., "Modulation of Printed gratings as a Protection Against Copying", Optical Document Security, 1994, pp. 127-143, Chapter 7, ed. Rudolf L. van Renesse, Artech House, Inc., Boston.

Van Renesse, Rudolf L., "Noniridescent Optically Variable Devices," Optical Document Security, 1994, pp. 297-316, Chapter 15, ed Rudolf L. van Renesse, Artech House, Inc., Boston.

Wilson, Carla, "Plastic cash promotes Island projects," Times Colonist, Dec. 4, 2003.

Adler Tech International, Power Point slide presentation, "2002 Demo", alleged to have bee shown to numerous parties from Apr. 2003 to Aug. 2003.

2002 Check Scan/Verification Demo.

Adler Tech International, Inc., "The World of Private Currency, HALO Covert Features," at www.adlertech.com. 2006.

Adler Tech International, Inc., "When Failure is Not an Option, College of Physicians & Surgeons," at www.adlertech.com. 2006.

International Search Report, PCT/US2004/001360, mailed Nov. 23, 2004.

International Search Report, PCT/US2005/031440, mailed Apr. 27, 2006.

Central European Bank: "50 euro note" Data European Community, XX, XX, No. v1457742291, Jan. 1, 2002.

International Search Report, PCT/US2003/032159, mailed Mar. 9, 2004.

International Search Report, PCT/US2004/014517, mailed Aug. 10, 2004.

Adler Tech International, Inc., "When Failure is Not an Option, Guardian Angel," at www.adlertech.com. 2006.

International Search Report, PCT/US2007/067657, mailed Nov. 12, 2007.

International Search Report and Written Opinion for related application No. PCT/US08/073317.

Canadian Intellectual Property Office Action for related application No. 2,501,513 dated Nov. 9, 2007.

Information Disclosure Statements Filed Jan. 27, 2005, Sep. 16, 2006 and Sep. 28, 2007 respectively with respect to Abandoned related U.S. Appl. No. 10/895,822 filed Jul. 22, 2004.

Office Actions filed Nov. 16, 2007 and May 12, 2008 respectively with respect to abandoned related U.S. Appl. No. 10/895,822 filed Jul. 22, 2004.

Information Disclosure Statements Filed Jan. 4, 2007 and Jun. 15, 2007 respectively with respect to U.S. Appl. No. 10/555,936.

International Search Report (ISR) and Written Opinion for related application No. PCT/US2004/014517.

Extended European Search Report issued Mar. 9, 2010 in corresponding European Patent Application No. 08 82 7199.4 (10 pages).

* cited by examiner

SINGLE-COLOR SCREEN PATTERNS FOR COPY PROTECTION

CROSS-REFERENCE TO RELATED APPLICATIONS

This application is a continuation-in-part of U.S. application Ser. No. 10/895,822, filed on Jul. 22, 2004, as a Continuation of International Application No. PCT/US2003/32159, filed on Oct. 9, 2003, under the common title "Document Containing Security Images" and both prior applications are hereby incorporated by reference.

TECHNICAL FIELD

The invention relates to the protection of documents, including various forms of printed matter, and to security features incorporated into documents for such purposes as authenticating or validating originals and distinguishing unauthorized copies.

BACKGROUND OF THE INVENTION

Secure documents have been produced in the past by letterpress, offset, and intaglio printing processes, including such processes adapted for embedding hidden information or security images. The hidden information or security images, often referred to as latent images, are printed so as to be effectively invisible to the unaided eye but can be detected using various optical enhancements. Document embedded security features deter counterfeiting of valuable papers, important records, ID cards, and financial instruments such as checks, currency, so that original documents can be verified and unauthorized copies of these documents can be readily distinguished from the originals.

The latent images, which often contain covert information or other indicia such as security codes, graphics, or information within the original documents, can be hidden within visually integrated settings so as to be practically invisible to the unaided eye under normal viewing conditions. Such settings for hiding the latent images range from simple background tints to the remainders of composite images within which the latent images are hidden. However, the latent images are otherwise distinguishable through the use of a visual aid, such as a magnifier or reader. Upon reproduction, such as by scanning or copying of the originals, the latent images can be arranged either to disappear or to become more pronounced. That is, either the absence of the latent image or the visible presence of the latent image in a copy can be construed as an indication of a non-original document.

Such latent images can be produced by embedding one line-screen pattern within another line-screen pattern. Each of the line-screen patterns can be formed by an array of print elements, such as dots, dashes, line segments, or other elemental shapes, in an arrangement of systematically spaced lines. The two line-screen patterns can be formed or otherwise camouflaged so as to be indistinguishable from one another to the unaided eye, but can differ in some respect that can be optically exploited for viewing the latent image. For example, the two line-screen patterns can be printed in the same color and at the same print density but can differ in orientation or line frequency.

A first line-screen pattern can be printed in defined areas having one or more shapes for forming the latent image. A second line-screen pattern can be printed throughout an adjoining or an enlarged area forming a visually integrated setting, such as a complementary background or a remaining portion of a composite image. Each of the two line patterns can be formed by a plurality of line patterns in different colors so long as the multiple line patterns that form the latent image match the color and overall appearance of the one or more line patterns that form the visually integrated setting.

Although invisible to the unaided eye, the latent images can be detected by various optical enhancements such as through optical overlays that increase contrast between the latent images and their visually integrated settings. For example, viewers containing screen patterns that match one of the underlying screen patterns of the latent images or their visually integrated settings can fill in or obscure one line pattern with respect to another.

In addition to the authentication and validation of originals, the latent images can also be used to distinguish copies from originals. For example, the latent images themselves can be rendered visible by copying for revealing messages such as "void" or "unauthorized copy" on the reproductions. Alternatively, the latent images can be arranged so as not to reproduce, so the absence of the latent image indicates a copy.

Other developments for purposes of providing document protection are disclosed in the patent literature, as for example, in U.S. Pat. No. 5,018,767 issued May 28, 1991; U.S. Pat. No. 5,193,853 issued Mar. 16, 1993; and U.S. Pat. No. 3,675,948 issued Jul. 11, 1972; and U.S. Pat. No. 4,143,967 issued Mar. 13, 1979, all to Ralph C. Wicker. All of these patents, which are hereby incorporated by reference, disclose various means for providing methods and products to enable copies of documents to be distinguished from the originals, as for example, by a "large dot-small dot pattern", a "close line-spaced pattern", and images or indicia which are screen printed at minutely varied spaces and/or angles on the originals and are intended to produce a highly visible moiré pattern effect on the unauthorized copies. In this specification, the words "print", "printed" and "printing" are used to refer to the making of an original document by any of a number of known printing means, including transferring images from one source to another, typically a paper medium, using a transfer agent such as ink or toner. The words "copy" and "copying" are used to refer to making copies from an original printed document also by any number of known copying means including by such means as digitally copying or scanning for output to a printer.

Copier and computer scanner-printer technologies continue to evolve in ways that can thwart intentions for rendering the latent images irreproducible in their original form. A goal of these technologies is to obtain copies as good as an original. Copiers, scanners, and other duplicating equipment, including desktop publishing systems, have become increasingly sophisticated in color reproduction, including the color matching of copies to color standards such as the Pantone Color Matching System.

Many of these document protection methods and products were developed before such significant improvements in copier and computer reproduction technologies and are no longer as effective for distinguishing copies from originals. Thus, further improvements in the area of document protection are needed, especially for distinguishing copies from originals to prevent unauthorized copying of valuable documents.

SUMMARY OF THE INVENTION

We have discovered unique formulations for both authenticating and preventing unauthorized reproduction of latent images containing hidden information or other indicia within original documents. Such latent images together with their visually integrated settings are reproduced as generally solid tones formed by altered or otherwise transformed screen patterns no longer encoding the latent images in their original form. Copies of protected documents are rendered obvious by the alteration or transformation of the screen patterns from which the latent images and their visually integrated settings were originally formed.

One version of the invention as a verifiable document includes a latent image embedded within a visually integrated setting of the document. The latent image and the visually integrated setting, which can be incorporated into the document in various forms such as bars, banners, borders, meaningful shapes, or as portions of art works or other graphic images, are formed by patterns of relatively oriented print elements. The print element patterns of the latent image and the visually integrated setting have common colors, common print densities, and common line frequencies within at least one of two combinations of print densities and line frequencies. The first is a combination of print densities of at least 20 percent and line frequencies of at least 175 lines per inch, and a second is a combination of print densities of at least 50 percent and line frequencies of less than 175 lines per inch. The commonalities among the colors and print densities of the print element patterns do not need to be exact but should be close enough so that the latent image remains at least partially indistinguishable from its visually integrated setting to the unaided eye.

For example, the common print densities are preferably within approximately 5 percent of each other, and the common line frequencies are preferably within approximately 20 percent of each other and more preferably within 10 percent of each other. However, the print element patterns of the latent image and the visually integrated setting preferably differ in angular orientation by at least 5 degrees and more preferably by at least 30 degrees so that the latent image is distinguishable from the visually integrated setting with a matching visual aid.

The matching visual aid can be a viewer oriented to exploit the different angular orientations of the print element patterns of the latent image and the visually integrated setting in the verifiable document to produce contrast between the two patterns. The viewer can contain a line-screen pattern with a line frequency having an integer multiple relationship (i.e., an even multiple or even quotient) with the line frequency of the latent image or visually integrated setting. The angular difference between the print element patterns of the latent image and the visually integrated setting produces contrasting moiré effects (e.g., more or less fringes) when the screen pattern of the viewer is aligned with the print element pattern of one or the other of the latent image and visually integrated setting.

The above-described combinations of print densities and line frequencies of the latent image and visually integrated setting interfere with the digital reproduction of the verifiable document. As reproduced by a majority of commercial digital copiers, the latent image and the visually integrated setting are not similarly contrastable by the matching viewer. For example, the latent image and the visually integrated setting can be reproduced as a solid tone on the digitally reproduced copies. The solid tone often has a print density noticeably above or below the common print density of the print element patterns of the latent image and the visually integrated setting. The original print element patterns of the latent image and visually integrated setting are at least partially replaced by print elements in other (including random) orientations or frequencies, which tend to blur differences between the latent image and visually integrated setting and partially or even completely fill in spaces not previously occupied by the original print elements. As a result, the contrast between the latent image and the visually integrated setting through the matching viewer is significantly reduced in the copies.

The common line frequencies are preferably at least 175 lines per inch (69 lines per centimeter), more preferably between 175 lines per inch and 200 lines per inch (79 lines per centimeter), and even more preferably approximately 180 lines per inch (71 lines per centimeter). The common print densities are preferably at least 20 percent and more preferably between 20 percent and 50 percent. However, at common line frequencies below 175 lines per inch, the common print densities are preferably at least 50 percent. Common line frequencies of at least 65 lines per inch are preferred at the print densities of at least 50 percent. The print element patterns of the latent image and visually integrated setting have angular orientations that preferably differ by at least 5 degrees, more preferably by at least 30 degrees, and most preferably by 45 degrees.

Another version of the invention as a copy-protection system for verifiable documents includes a document containing a verifiable security feature as a latent image within a visually integrated setting. The latent image and the visually integrated setting are substantially indistinguishable to the unaided eye but are visually contrastable for verification through a visual aid. Print elements of the latent image and the visually integrated setting are arranged in patterns so that the latent image and the visually integrated setting digitally reproduce in altered graphic forms that are not similarly contrastable (e.g., contrast significantly reduced) through the visual aid as originally oriented with respect to the latent image and visually integrated setting of the document.

The print elements of the latent image and the visually integrated setting preferably have common colors, common print densities, and common line frequencies so as to render the latent image and the visually integrated setting substantially indistinguishable to the unaided eye. However, the print elements of the latent image and the visually integrated setting differ from one another in angular orientation so that the latent image can be distinguished from the visually integrated setting through the visual aid. The differing angular orientations produce contrasting moiré effects (e.g., more or less fringes) that allow the latent image to be viewed for authenticating the document. However, upon digital reproduction, the latent image and the visually integrated setting are not similarly contrastable by the matching viewer as originally oriented with respect to the latent image and visually integrated setting of the document.

Another version of the invention involves a method of distinguishing a copy of an original copy-protected document from the original copy-protected document. A latent image is embedded in a visually integrated setting of the original copy-protected document using patterns of print elements. The patterns of print elements for the latent image and the visually integrated setting are arranged with common colors, common print densities, and common line frequencies so that the latent image is at least partially indistinguishable from the visually integrated setting to the unaided eye. However, the patterns of print elements for the latent image and the visually integrated setting sufficiently differ in at least one respect, such as being oriented at different angles (e.g., 5 degrees or greater) so that the latent image and the background can be contrasted by a visual aid. The copy-protected document is digitally reproduced, reproducing the latent image and the visually integrated setting in one or more patterns of print elements that differ from the original patterns of the print elements of the latent image and the visually integrated setting so as not to be similarly contrastable by the visual aid as originally oriented with respect to the latent image and visually integrated setting of the copy-protected document.

Yet another version of the invention involves a method of making a copy-protected document. First and second patterns of print elements are printed on a document in common colors, common print densities within 10 percent of each other, and common line frequencies within 20 percent of each other for hiding a latent image within a visually integrated setting. Nonetheless, the first and second patterns are differentiated so that the latent image of the first pattern is distinguishable from the visually integrated setting of the second pattern with a visual aid. The line frequencies and print densities are arranged so that the latent image and the visually integrated setting reproduce on a majority of commercial digital copiers in an altered form that is not similarly contrastable by the same visual aid as originally oriented with respect to the latent image and visually integrated setting of the copy-protected document.

For verifying the authenticity of the copy-protected document, the visual aid can be arranged as a viewer can be arranged for distinguishing the latent image from the visually integrated setting, such as on the basis of differing line frequencies or differing orientation angles sufficient to produce differing moiré effects (e.g., more or less fringes) between the latent image that the visually integrated setting. However, upon digital reproduction of the copy-protected document, this basis for distinguishing the latent image from the visually integrated setting is lost, and the copy is not verifiable as an original.

DETAILED DESCRIPTION OF THE INVENTION

Figure 1:
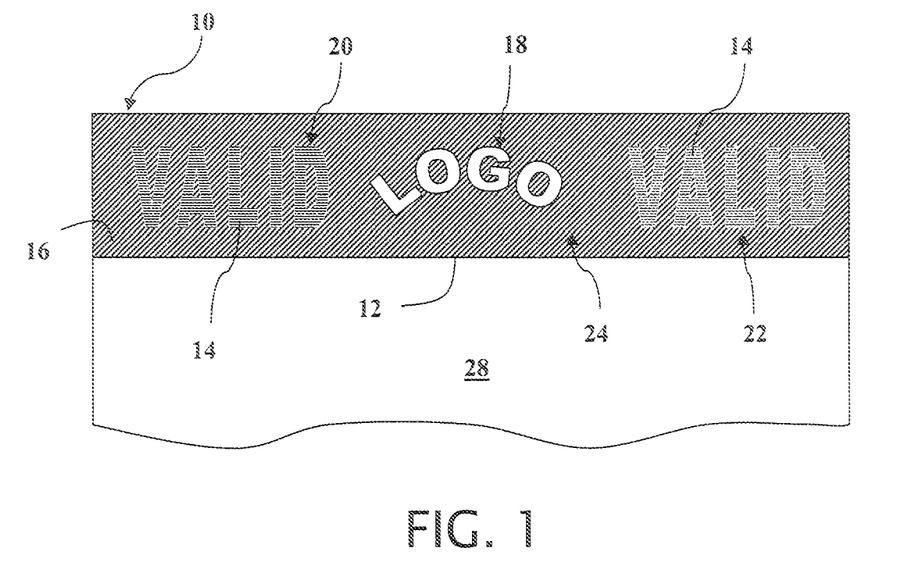
FIG. 1 is a front view of a truncated copy-protected document in accordance with this invention having a banner containing latent images (i.e., the word "VALID") formed by line-screen patterns of exaggerated pitch and outlined for rendering the otherwise hidden latent image visible within the banner.
Figure 2:
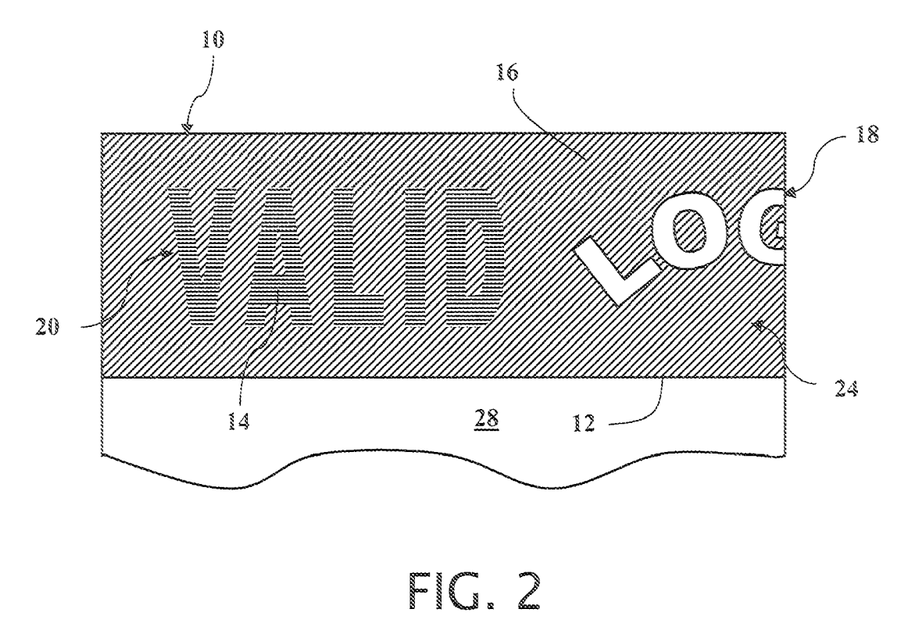
FIG. 2 is an enlarged view of a portion of the banner better showing the relatively oriented line-screen patterns used for defining but otherwise hiding the latent image "VALID".
Figure 3:
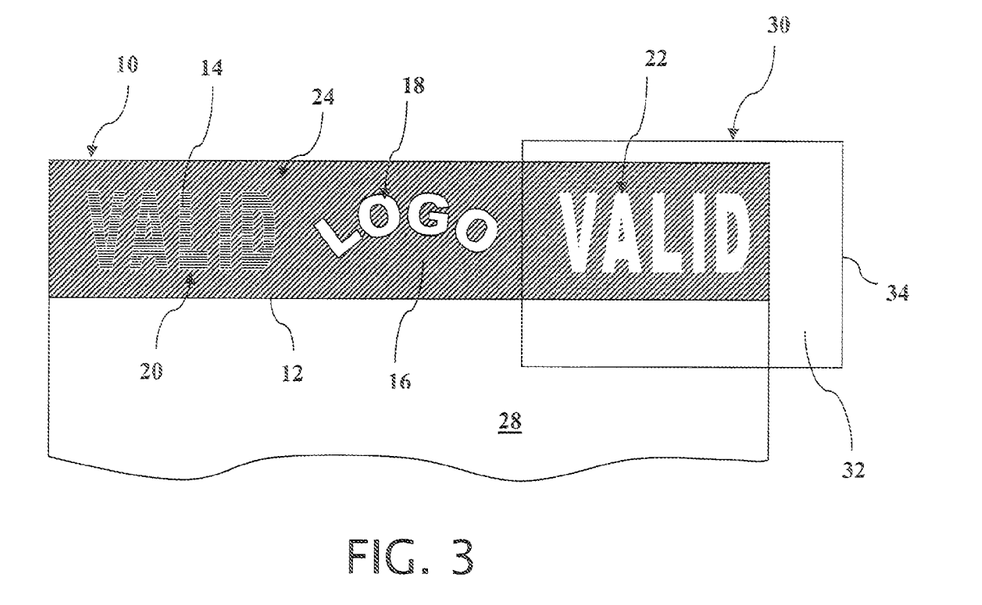
FIG. 3 is a similar front view of the copy-protected document with a decoding viewer overlay for revealing the latent image.

A copy-protected document 10 as shown in FIGS. 1-3 has a top banner 12 formed by relatively oriented line-screen patterns 14 and 16. Centered within the banner 12, as an example of ancillary additional printing structures, is a text or graphics indicium 18, depicted by the word "LOGO". The line-screen patterns 14 form latent images 20 and 22 as the word "VALID", which is at least partially hidden to the unaided eye within a visually integrated setting 24 (a background) formed by the line-screen pattern 16. A substrate 28 on which the banner 12 is printed can be any of a variety of print mediums, including paper, plastic, film, in single or multi-ply constructions.

The two line-screen patterns 14 and 16 are formed by arrays of print elements, which in this case are continuous lines but could also be dots, diamonds, dashes, line segments, and or other elemental shapes, in an arrangement of systematically spaced lines (curved or straight). Except for orientation angle, the two line-screen patterns 14 and 16 are largely indistinguishable as being printed in matching colors, line frequencies, and print densities. For example, the line-screen patterns 14 of the latent images 20 and 22 are printed at 0 degrees (i.e., along the width of the document 10), and the line-screen pattern 16 of the visually integrated setting 24 is printed at 45 degrees. In general, the line-screen patterns 14 and 16 with matching line frequencies are preferably separated through an angle of at least 5 degrees, more preferably through an angle of at least 30 degrees, and even more preferably (as shown in this example) at approximately 45 degrees.

The colors and print densities of the two line-screen patterns 14 and 16 match so that the latent images 20 and 22 are at least partially indistinguishable from the visually integrated setting 24 to the unaided eye. The print densities of the line-screen patterns 14 and 16 preferably match within 10 percent and more preferably within 5 percent of each other. Similarly, the line frequencies of the line-screen patterns 14 and 16 preferably match within 20 percent and more preferably within 10 percent of each other. However, as shown in FIG. 3, a viewing device 30, having a line-screen pattern 32 with a line frequency matching the line frequency of the screen patterns 14 and 16, is angularly oriented to one or the other of the screen patterns 14 or 16 to provide contrast between the two. The line-screen pattern 32 can be phase shifted to align with the lines of the underlying line-screen patterns 14 or 16 or with the spaces between these lines for making the latent image 22 appear lighter (as shown), darker, or some different frequency combination of the two relative to the visually integrated setting 24. The overlapping line-screen pattern 32 of the viewing device 30 produces different moiré effects (e.g., more or less fringes) in combination with the screen patterns 14 and 16 of the latent images 20 and 22 and the visually integrated setting 24. The differing moiré effects produce a clearly distinguishable contrast between one or more of the latent images 20 and 22 and the visually integrated setting 24.

The line frequency of the line-screen pattern 32 can match the common line frequency of the line-screen patterns 14 and 16 on a 1-to-1 basis or as an integer multiple or integer quotient of the common line frequencies. The match does not need to be exact but close enough so that a visible contrast is formed between the latent image 22 and the visually integrated setting 24 as a result of the differing orientations of the line-screen patterns 14 and 16 to the line-screen pattern 32. Similarly, the common line frequencies among the line-screen patterns 14 and 16 do not need to be exact but should be close enough so that the line-screen pattern 32 can produce effective visual contrast with either of the line-screen patterns 14 or 16 when oriented into alignment with either pattern. In fact, subtle differences in line frequency between the two line-screen patterns 14 and 16, such as line frequencies of 178 and 182, can be used as a further authenticating feature that would otherwise not affect the ability of the latent image 22 to remain hidden within its visually integrated setting 24 to the unaided eye or the ability of the viewing device 30 to produce the required contrast for distinguishing the latent image 22 from its visually integrated setting 24 based on the different angular orientations or their respective line-screen patterns 14 and 16.

The viewing device 30, which is shown in the form of a transmissive plate, can be held against the copy-protected document 10 and rotated for aligning its line-screen pattern 32 with the line-screen pattern 14 or 16 of the latent image 22 of the visually integrated setting 24. Approaching an orientation of alignment, interfering fringes (not shown) appear that progressively reduce in number and can disappear entirely if the 1-to-1 matching frequencies are perfectly aligned.

The substrate 34 of the viewing device 30 can be made of plastic, glass, film or other optically transmissive material. The substrate 34 can also be formed of as a lens, preferably with magnifying power. The line-screen pattern 32 can be printed or embossed in the substrate 34, such as by silkscreen printing or laser burning. The substrate 34 can be clear, tinted, or lined to assist the viewing of the latent images 20 and 22 and can contain one or more than one distinct areas for viewing of multiple screened areas. Each of the screened areas can be formed by screen patterns of different color, line frequency, print density, and relative angular orientation, and each of the distinct areas of the substrate 34 can have a line frequency corresponding to one or more of the screen patterns.

Although shown at an exaggerated pitch, i.e., a low line frequency, for purposes of illustration, both of the line-screen patterns 14 and 16 preferably share substantially the same line frequency of at least 175 lines per inch (69 lines per centimeter). The matching line frequencies are more preferably between 175 lines per inch and 200 lines per inch (79 lines per centimeter) and even more preferably approximately 180 lines per inch (71 lines per centimeter). The print densities of the line-screen patterns 14 and 16 are also matched at print densities of at least 20 percent and more preferably between 20 percent and 50 percent. Alternatively, at matching line frequencies below 175 lines per inch, the matching print densities are preferably at least 50 percent. Within the lower range, the matching line frequencies are preferably at least 65 lines per inch, and the required print densities tend to be higher approaching line frequencies of 65 lines per inch than the print densities required for line frequencies approaching 175 lines per inch. For example, print densities of at least 60 percent are preferred at the lower end of the range. As used herein, print density is generally defined as the percent of a printed area covered by the print elements. The remaining space of the printed area is located between the lines or between print elements along the lines. The remaining space is assumed to be white, and the effective print density is adjusted depending upon any color contribution of the remaining space.

Figure 4:
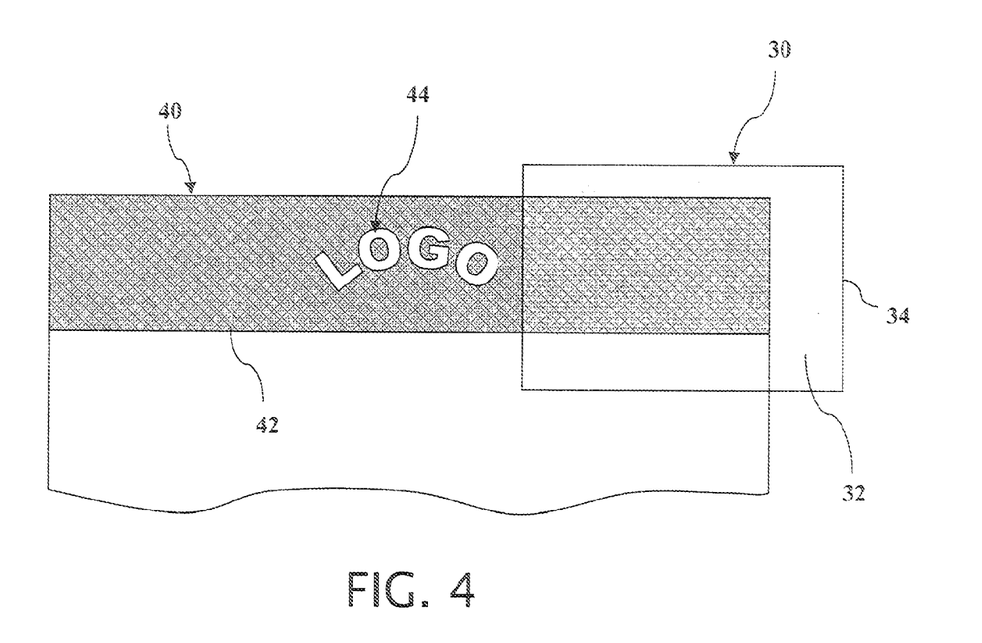
FIG. 4 is a front view of a truncated copy of the copy-protected document as reproduced on a conventional digital copier in which the line-screen patterns of the latent image and the banner reproduce as an uninterrupted solid tint.

The matching line frequencies and print densities are set in relation to the resolving capabilities of a majority of digital copiers (i.e., at least among the most widely used models) to reproduce the line-screen patterns. The combinations of line frequencies and print densities are set so that the original screen patterns are largely replaced by screen patterns in a different form not matched with the intended viewer. Preferably, the angular difference between the line-screen patterns 14 and 16 is also not accurately reproduced in the copies. The preferred intention of the invention is not for the line-screen patterns 14 or 16 of the latent images 20 and 22 and the visually integrated setting 24 to be entirely undetectable in the copies but to be not reproducible as line-screen patterns with the same line frequencies and orientations. Often, however, the line-screen patterns 14 and 16 reproduce in a common graphic form, such as a solid tint as seen in FIG. 4. Print elements within the reproduced line-screen patterns preferably fill in spaces not previously occupied by the print elements of the original line-screen patterns 14 and 16.

The line frequencies of at least 175 lines per inch combined with the print densities of at least 20 percent or the line frequencies of less than 175 lines per inch combined with print densities of at least 50 percent overcome the apparent resolving capabilities of digital copiers, including scanners and other digital reproducing technologies, resulting in reproductions that do not similarly discriminate between the original latent images 20, 22 and the visually integrated setting 24. That is, the original print element patterns of the latent image and visually integrated setting are at least partially replaced by print elements in other (including random) orientations or frequencies, which tend to blur differences between the latent images and visually integrated settings and partially or even completely fill in spaces not previously occupied by the original print elements.

FIG. 4 depicts a digital copy 40 of the copy-protected document 10 in which the banner 12 formed by the line-screen patterns 14 and 16 is reproduced in the copy 40 as a modified banner 42 having a common graphic form throughout the regions originally represented by the different line-screen patterns 14 and 16. The logo 18 (FIGS. 1-3), which is not formed by one of the combinations of common line frequencies and common print densities of the line-screen patterns 14 and 16, is accurately reproduced as the logo 44. The banner 42 can have a solid tint at a shade darker or lighter than the original banner 12 and can be formed by a common graphic pattern throughout, e.g., a common halftone or line-screen pattern. A color, textural, or other graphic overlay (not shown) could be incorporated into the original banner 12 for camouflaging the original orientation difference between the line-screen patterns 14 and 16. Such overlays can be printed separately or incorporated into the line-screen patterns as higher order variations in amplitude or frequency. Any reproduction of such overlays would be independent of differences between the orientations of the line-screen patterns 14 and 16.

Figure 5:
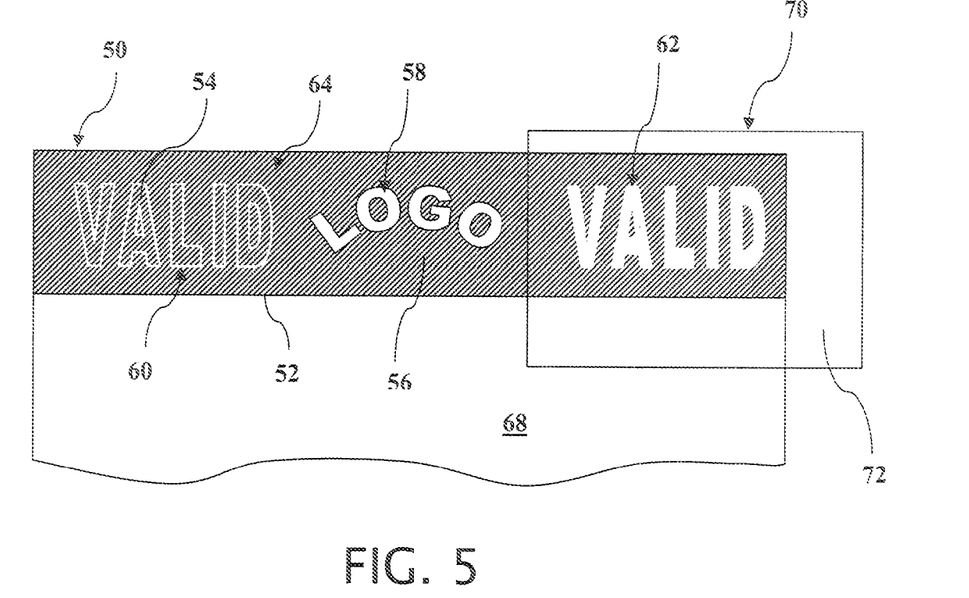
FIG. 5 is a front view of an alternative copy-protected document in truncated form with a decoding viewer overlay for revealing a latent image.
Figure 6:
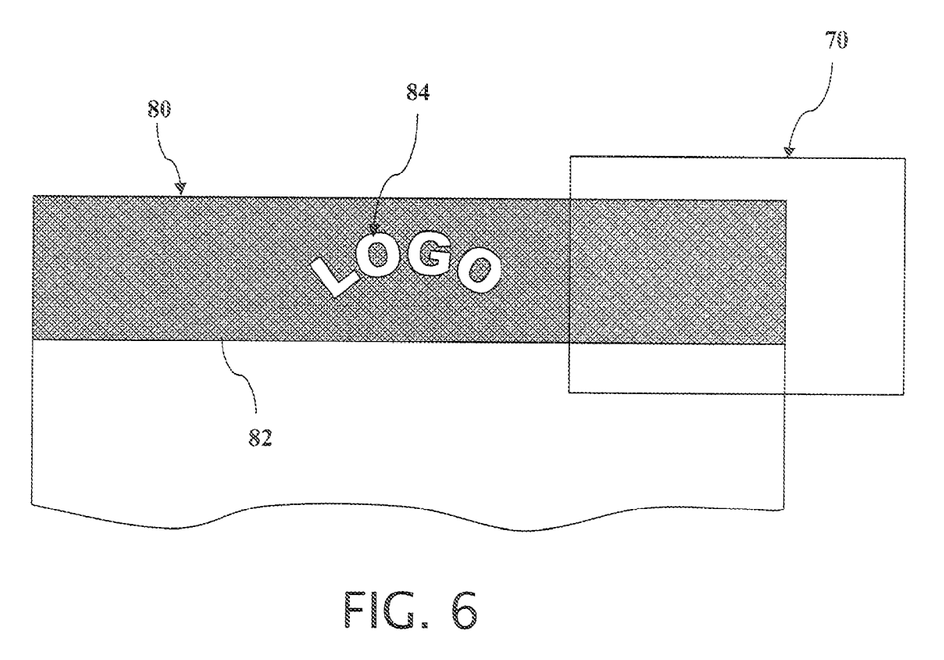
FIG. 6 is a front view of a copy of the copy-protected document of FIG. 5 as reproduced on a conventional digital copier in which line-screen patterns of the latent image and the banner reproduce as an uninterrupted solid tint.

An alternative copy-protected document 50 is shown in FIGS. 5 and 6 with latent images 60 and 62 hidden within a visually integrated setting 64 (as a background)—together forming a banner 52 on a substrate 68, which can be overprinted by a text or graphics indicium 58, depicted by the word "LOGO". The latent images 60 and 62 depicting the word "VALID" are formed by a line-screen pattern 54 oriented at an approximately 45 degree angle to the orthogonal axes of the document 50. The visually integrated setting 64 is formed by the line-screen pattern 56 also oriented at an approximately 45 degree angle to the orthogonal axes of the document 50.

In addition to being oriented at the same angle (e.g., 45 degrees), the two line-screen patterns 54 and 56 are printed in a common color and at a common print density to hide the latent images 60 and 62 within the visually integrated setting 64. However, for purposes of illustration, the latent image 60 is outlined against the visually integrated setting 64 with white space. The line frequencies of the line-screen patterns 54 and 56 preferably differ by only approximately 5 percent to 20 percent of each other. The difference in line frequency is small enough to help hide the latent images 60 and 62 but is large enough to be exploited by a viewer 70, which can be similar to the viewer 30 (FIG. 3), for visually contrasting the latent images 60 or 62 from the visually integrated setting 64 as also shown in FIG. 5.

Similar to the copy protected document 10 of FIGS. 1-3, the substrate 68 on which the banner 52 is printed can be any of a variety of print mediums, including paper, plastic, film, in single or multi-ply constructions. The two line-screen patterns 54 and 56 are also formed by arrays of print elements, which are depicted as continuous lines but could also be dots, diamonds, dashes, line segments, and or other elemental shapes, in an arrangement of systematically spaced lines (curved or straight). Although differing slightly in line frequency, the line-screen patterns 54 and 56 substantially match in color, print density, and orientation angle. As a result, the latent images 60 and 62 are at least partially indistinguishable from the visually integrated setting 64 to the unaided eye.

However, as also shown in FIG. 5, the viewing device 70 has a line-screen pattern 72 with a line frequency matching the line frequency of one or the other of the line-screen patterns 54 and 56 to provide contrast between the two patterns 54 and 56. When matched to the line-screen pattern 54, the line-screen pattern 72 can be phase shifted to align with the lines of the underlying line-screen pattern 54 or with the spaces between these lines for making the latent image 62 appear lighter (as shown), darker, or some different frequency combination of the two in comparison to the visually integrated setting 64. The overlapping line-screen pattern 72 of the viewing device 70 produces different moiré effects between the line-screen patterns 54 and 56. When oriented into alignment with the two line-screen patterns 54 and 56, the line-screen pattern (e.g., 56) that differs most from the line-screen pattern 72 of the viewing device 70 produces more fringes than the line-screen pattern (e.g., 54) that matches the line-screen pattern 72. The differing moiré effects produce a clearly distinguishable contrast between one or more of the latent images 60 or 62 and the visually integrated setting 64.

The line frequency of the line-screen pattern 72 can match the line frequency of either of the line-screen patterns 54 or 56 on a 1-to-1 basis or as an integer multiple or integer quotient of the line frequency. The match does not need to be exact but close enough so that a visible contrast is formed between the latent image 60 or 62 and the visually integrated setting 64 as a result of the differing line frequencies of the line-screen patterns 54 and 56.

Although the line-screen patterns 54 and 56 differ from each other in line frequency by as much as 20 percent, the line frequencies of both line-screen patterns 54 and 56 are preferably at least 175 lines per inch (69 lines per centimeter) and even more preferably between 175 lines per inch and 200 lines per inch (79 lines per centimeter). The print densities of the line-screen patterns 54 and 56 are matched at print densities of at least 20 percent, more preferably between 20 percent and 50 percent. Alternatively, the line frequencies of both line-screen patterns 54 and 56 are preferably at least 65 lines per inch and less than 175 lines per inch (69 lines per centimeter) and the print densities of the line-screen patterns 54 and 56 are matched at print densities of at least 50 percent. Print densities of 60 percent or more are preferred for the lower end of the range beginning at 65 lines per inch.

The combinations of line frequencies and print densities are set beyond the resolving capabilities of a majority of digital copiers (i.e., at least among the most widely used models) to reproduce the line-screen patterns. That is, the combinations of line frequencies and print densities are set so that the original screen patterns are largely replaced by screen patterns in a different form not matched with the intended viewer 70. Preferably, the line frequency difference between the line-screen patterns 54 and 56 is not accurately reproduced in the copies. That is, the line-screen patterns 54 or 56 of the latent images 60 and 62 and the visually integrated setting 24 need not be entirely indistinguishable in the copies but should be reproduced in different forms no longer distinguishable on the basis of their original line frequencies and orientations. More preferably, the line-screen patterns 54 and 56 are reproduced in a common graphic form, such as a solid tint as seen in FIG. 6. Print elements within the reproduced line-screen patterns preferably fill in spaces not previously occupied by the print elements of the original line-screen patterns 54 and 56.

FIG. 6 depicts a digital copy 80 of the copy-protected document 50 in which the banner 52 (FIG. 5) formed by the line-screen patterns 54 and 56 is reproduced in the copy 80 as a modified banner 82 having a common graphic form throughout the regions originally represented by the different line-screen patterns 54 and 56. The logo 58 (FIG. 5), which is not formed by one of the combined line-frequency, print density line-screen patterns 54 and 56, is accurately reproduced as the logo 84. The banner 82 has a solid tint, which can be a shade darker (as shown) or lighter than the original banner 52 and is formed by a common graphic pattern throughout, e.g., a common halftone or line-screen pattern. A color, textural, or other graphic overlay (not shown) could be incorporated into the original banner 52 for camouflaging the original orientation difference between the line-screen patterns 54 and 56. Such overlays can be printed separately or incorporated into the line-screen patterns as higher order variations in amplitude or frequency. Any reproduction of such overlays would be independent of differences between the orientations of the line-screens 54 and 56.

Although shown as a banner 12 or 52 in the illustrated embodiments, the common-color, common line frequency and print density combinations within the line-screen patterns can be incorporated into documents in a variety of ways, including as bars, borders, meaningful shapes, or as portions of art works or other graphic images. Although the overall print density in the latent images and their immediate visually integrated settings is at least 20 percent for line frequencies above 175 lines per inch and at least 50 percent for line frequencies below 175 lines per inch, additional variations in print density can be accommodated for purposes of blending into graphic designs, superimposing other graphic designs, or for other appearance reasons.

The invention has been described in conjunction with specific embodiments thereof, but it is evident that many alternatives, modifications and variations that fall within the spirit and broad scope of the appended claims.

The invention claimed is:

1. A document comprising:
   a latent image embedded within a visually integrated setting of the document,
   the latent image and the visually integrated setting being formed by patterns of relatively oriented print elements, and
   the print element patterns of both the latent image and the visually integrated setting being arranged with common colors, common print densities, and common line frequencies, the common print densities being at least 20 percent and the common line frequencies being at least 175 lines per inch.

2. The document of claim 1 in which the common print densities are within approximately 10 percent of each other and the common line frequencies are within approximately 20 percent of each other.

3. The document of claim 1 in which the common print densities are within approximately 5 percent of each other and the common line frequencies are within approximately 10 percent of each other.

4. The document of claim 1 in which the print element patterns of the latent image and the visually integrated setting are patterns of spaced lines having angular orientations that differ by at least 5 degrees.

5. The document of claim 1 in which the print element patterns of the latent image and the visually integrated setting are patterns of spaced lines having angular orientations that differ by at least 30 degrees.

6. The document of claim 1 in which the latent image is at least partially indistinguishable from the visually integrated setting to the unaided eye.

7. The document of claim 6 in which the print element patterns of the latent image and the visually integrated setting are patterns of spaced lines that differ in orientation enough that the latent image is distinguishable from the visually integrated setting via differing moiré patterns generated by an overlaid visual aid having a line frequency sufficiently close to the common line frequency of at least one of the latent image or the visually integrated setting such that the latent image is distinguishable from the visually integrated setting while the visual aid is aligned with the angular orientation of at least one of the patterns of spaced lines of either the latent image or the visually integrated setting.

8. The document of claim 7 in which the print element patterns of the latent image and the visually integrated setting digitally reproduce in an altered form so that the latent image is not distinguishable from the visually integrated setting with the same visual aid.

9. The document of claim 1 in which both the print element patterns of the latent image and the visually integrated setting comprise line-screen patterns, and wherein the line-screen patterns reproduce in an altered form on a digitally reproduced copy of the document such that the line-screen patterns of the latent image or the visually integrated setting are at least partially replaced, in the digitally reproduced copy, by print elements which blur differences between the latent image and the visually integrated setting.

10. The document of claim 9 in which the line-screen patterns of the latent image and the visually integrated setting are less distinguishable on the digitally reproduced copy of the document, thereby preventing the latent image from being distinguishable from the visually integrated setting in the digitally reproduced copy.

11. The document of claim 10 in which the digitally reproduced copy of the latent image and the visually integrated setting includes print elements that fill in spaces not occupied by the line-screen patterns of the latent image and the visually integrated setting.

12. The document of claim 1 in which the print element patterns of both the latent image and the visually integrated setting are printed in a single primary subtractive color.

13. The document of claim 1 in which the common line frequencies are between 175 lines per inch and 200 lines per inch.

14. The document of claim 13 in which the common print densities are between 20 percent and 50 percent.

15. A copy-protection system for verifiable documents comprising:
a document containing a verifiable security feature as a latent image within a visually integrated setting, the latent image and the visually integrated setting each comprising an array of print elements arranged in a pattern of spaced lines, the patterns of the latent image and the visually integrated setting configured with common colors, common print densities, and common line frequencies, the latent image and the visually integrated setting being substantially indistinguishable to the unaided eye but being visually contrastable for verification through a visual aid configured to provide a differing visual effect between the latent image and the visually integrated when overlaid on the document and aligned with at least one of the patterns of spaced lines in the array of print elements of the latent image or the visually integrated setting, and the print element patterns of the latent image and the visually integrated setting being arranged so that the latent image and the visually integrated setting digitally reproduce in an altered graphic form in which the latent image remains substantially indistinguishable from the visually integrated setting to the unaided eye and is not similarly contrastable through the visual aid as originally aligned with respect to the latent image and visually integrated setting of the document.

16. The system of claim 15 in which the print elements patterns of the latent image and the visually integrated setting are arranged so as to render the latent image and the visually integrated setting substantially indistinguishable to the unaided eye.

17. The system of claim 16 in which the common print densities are within approximately 10 percent of each other and the common line frequencies are within approximately 20 percent of each other.

18. The system of claim 16 in which the common print densities are within approximately 5 percent of each other and the common line frequencies are within approximately 10 percent of each other.

19. The system of claim 15 in which the patterns of spaced lines in the print element patterns of the latent image and the visually integrated setting sufficiently differ from one another in angular orientation enough that the latent image is visually contrasted with respect to the visually integrated setting through differing moiré patterns generated by an overlaid visual aid aligned with at least one of the patterns of spaced lines in the print element patterns of the latent image or the visually integrated setting.

20. The system of claim 19 in which the angular orientations of the patterns of spaced lines in the print element patterns of the latent image and the visually integrated setting differ by at least 5 degrees.

21. The system of claim 19 in which the angular orientations of the patterns of spaced lines in the print element patterns of the latent image and the visually integrated setting differ by at least 30 degrees.

22. The system of claim 15 in which the print element patterns of both the latent image and the visually integrated setting are arranged with the common print densities being at least 20 percent and the common line frequencies being at least 175 lines per inch.

23. The system of claim 22 in which the common line frequencies are between 175 lines per inch and 200 lines per inch.

24. The system of claim 23 in which the common print densities are between 20 percent and 50 percent.

25. A verifiable document comprising:
a latent image embedded within a visually integrated setting of the verifiable document,
the latent image and the visually integrated setting being formed by patterns of commonly oriented print elements,
the print element patterns of the latent image and the visually integrated setting being arranged with common colors, common print densities, and differing line frequencies, the common print densities being at least 20 percent and the differing line frequencies each being at least 175 lines per inch, and the line frequencies of the print element patterns of the latent image and the visually integrated setting differing by between 5 percent and 20 percent of each other.

26. The document of claim 25 in which the latent image is at least partially indistinguishable from the visually integrated setting to the unaided eye.

27. The document of claim 26 in which the line frequencies of the print element patterns of the latent image and the visually integrated setting differ by enough that the latent image is distinguishable from the visually integrated setting via differing moiré patterns generated by an overlaid visual aid having a line frequency sufficiently close to the line frequency of the print element pattern of one of the latent image or the visually integrated setting such that the latent image is distinguishable from the visually integrated setting while the visual aid is aligned with angular orientations of the commonly oriented print element patterns.

28. The document of claim 27 in which the print-elements element patterns of the latent image and the visually integrated setting digitally reproduce in an altered form so that the latent image is not similarly distinguishable from the visually integrated setting with the same visual aid.

29. The document of claim 25 in which the differing line frequencies of the print element patterns of both the latent image and the visually integrated setting are between 175 lines per inch and 200 lines per inch and the common print densities are between 20 percent and 50 percent.

30. The document of claim 25 in which the difference between the line frequencies of the print element patterns of the latent image and the visually integrated setting is enough that the latent image is visually contrasted from the visually integrated setting via differing moiré patterns generated by an overlaid visual aid aligned with the commonly oriented print element patterns of the latent image and the visually integrated setting.

31. The document of claim 25 in which the print element patterns of both the latent image and the visually integrated setting comprise line-screen patterns and wherein the line-screen patterns reproduce in an altered form on a digitally reproduced copy of the document such that the line-screen patterns of the latent image or the visually integrated setting are at least partially replaced, in the digitally reproduced copy, by print elements which blur the differences between the latent image and the visually integrated setting.

32. The document of claim 31 in which the line-screen patterns of the latent image and the visually integrated setting are less distinguishable on the digitally reproduced copy of the document, thereby preventing the latent image from being distinguishable from the visually integrated setting in the digitally reproduced copy.

33. The document of claim 31 in which the digitally reproduced copy of the latent image and the visually integrated setting includes print elements that fill in spaces not occupied by the line-screen patterns of the latent image and the visually integrated setting.

34. The document of claim 25 in which the print element patterns of the latent image and the visually integrated setting are arranged as patterns of spaced lines.

35. The document of claim 25 in which the print element patterns of the latent image and the visually integrated setting are arranged as systematically spaced lines that include continuous lines.

36. The document of claim 25 in which the common colors of the print element patterns are matching colors and the common print densities of the print element patterns are matching print densities.

37. The system of claim 15 in which the print element patterns of both the latent image and the visually integrated setting comprise line-screen patterns, and wherein the line-screen patterns reproduce in an altered form on a digitally reproduced copy of the document such that the line-screen patterns of the latent image or the visually integrated setting are at least partially replaced, in the digitally reproduced copy, by print elements which blur the differences between the latent image and the visually integrated setting.

38. The system of claim 37 in which the line-screen patterns of the latent image and the visually integrated setting are less distinguishable on the digitally reproduced copy of the document, thereby preventing the latent image from being distinguishable from the visually integrated setting in the digitally reproduced copy.

39. The system of claim 37 in which the digitally reproduced copy of the latent image and the visually integrated setting includes print elements that fill in spaces not occupied by the line-screen patterns of the latent image and the visually integrated setting.

40. The system of claim 19 in which the angular orientations of the patterns of spaced lines in the print element patterns of the latent image and the visually integrated setting differ by approximately 45 degrees.

41. The system of claim 15 in which patterns of spaced lines in the print element patterns of the latent image and the visually integrated setting are arranged as systematically spaced lines that include continuous lines.

42. The system of claim 15 in which the common line frequencies of the patterns of the latent image and the visually integrated setting are matching line frequencies.

43. The system of claim 15 in which the common colors of the patterns of the latent image and the visually integrated setting are matching colors, the common print densities of the patterns of the latent image and the visually integrated setting are matching print densities, and the common line frequencies of the patterns of the latent image and the visually integrated setting are matching line frequencies.

44. The document of claim 7 in which the print element patterns of the latent image and the visually integrated setting are patterns of spaced lines having angular orientations that differ by approximately 45 degrees.

45. The document of claim 1 in which the print element patterns of the latent image and the visually integrated setting are arranged as patterns of spaced lines.

46. The document of claim 1 in which the print element patterns of the latent image and the visually integrated setting are arranged as systematically spaced lines that include continuous lines.

47. The document of claim 46 in which the common line frequencies of the print element patterns are matching line frequencies.

48. The document of claim 1 in which the common line frequencies of the print element patterns are matching line frequencies.

49. The document of claim 1 in which the common colors of the print element patterns are matching colors, the common print densities of the print element patterns are matching print densities, and the common line frequencies of the print element patterns are matching line frequencies.

50. A verifiable document comprising:
a latent image including a first line-screen pattern formed by an array of print elements arranged as systematically spaced lines having a first color, a first print density, a first angular orientation, and a first line frequency;

a visually integrated setting surrounding the latent image, the visually integrated setting including a second line-screen pattern formed by an array of print elements arranged as systematically spaced lines having a second color, a second print density, a second angular orientation, and a second line frequency;

wherein the first color matches the second color and the first print density matches the second print density, such that the latent image is substantially indistinguishable from the visually integrated setting to the unaided eye;

wherein at least one of a difference between the first and second angular orientations or a difference between the first and second line frequencies is sufficient to allow the latent image to be distinguishable from the visually integrated setting via a visual aid having a line frequency configured to generate differing interference patterns for the latent image and the visually integrated setting while the visual aid is aligned with at least one of the first or second line-screen patterns; and wherein the document is further configured such that a digitally reproduced copy of the latent image and the visually integrated setting includes print elements that fill in spaces not occupied by the first and second line-screen patterns so as to blur the differences between the latent image and the visually integrated setting so that the latent image is not similarly distinguishable from the visually integrated setting with the same visual aid.

51. The verifiable document of claim 50, wherein the first line frequency matches the second line frequency and wherein the first angular orientation and the second angular orientation differ by at least 5 degrees.

52. The verifiable document of claim 51, wherein the first angular orientation and the second angular orientation differ by at least 30 degrees.

53. The verifiable document of claim 50, wherein the first angular orientation matches the second angular orientation such that the first and second line-screen patterns are commonly aligned, and wherein the first line frequency and the second line frequency differ by at least 5 percent.

54. The verifiable document of claim 53, wherein the first line frequency and the second line frequency differ by between 5 percent and 20 percent.

55. The verifiable document of claim 50, wherein the first line frequency and the second line frequency are each at least 175 lines per inch, and wherein the first print density and the second print density are each at least 20 percent.

56. The verifiable document of claim 55, wherein the first line frequency and the second line frequency are each between 175 lines per inch and 200 lines per inch, and wherein the first print density and the second print density are each between 20 percent and 50 percent.

57. The verifiable document of claim 50, wherein the first line frequency and the second line frequency are each less than 175 lines per inch, and wherein the first print density and the second print density are each at least 50 percent.

58. The verifiable document of claim 50, wherein the array of print elements arranged as systematically spaced lines of the first and second line-screen patterns include continuous lines.

* * * * *